(12) United States Patent
Ninoyu et al.

(10) Patent No.: US 10,583,815 B2
(45) Date of Patent: *Mar. 10, 2020

(54) HYDRAULIC PRESSURE CONTROL DEVICE

(71) Applicants: Advics Co., Ltd., Kariya-shi, Aichi-ken (JP); Toyota Jidosha Kabushiki Kaisha, Toyota-shi, Aichi-ken (JP)

(72) Inventors: Masaki Ninoyu, Obu (JP); Takahiro Okano, Chiryu (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 65 days.

This patent is subject to a terminal disclaimer.

(21) Appl. No.: 15/763,235

(22) PCT Filed: Sep. 28, 2016

(86) PCT No.: PCT/JP2016/078589
§ 371 (c)(1),
(2) Date: Mar. 26, 2018

(87) PCT Pub. No.: WO2017/057440
PCT Pub. Date: Apr. 6, 2017

(65) Prior Publication Data
US 2018/0304870 A1 Oct. 25, 2018

(30) Foreign Application Priority Data
Sep. 30, 2015 (JP) .................. 2015-194735

(51) Int. Cl.
*B60T 13/68* (2006.01)
*B60T 8/174* (2006.01)
(Continued)

(52) U.S. Cl.
CPC .............. *B60T 8/174* (2013.01); *B60T 7/042* (2013.01); *B60T 13/14* (2013.01); *B60T 13/146* (2013.01);
(Continued)

(58) Field of Classification Search
CPC .......... B60T 8/174; B60T 7/042; B60T 13/14; B60T 13/146; B60T 13/662; B60T 13/68;
(Continued)

(56) References Cited

U.S. PATENT DOCUMENTS 8,870,301 B2 * 10/2014 Ohkubo ................ B60T 8/3655
303/116.1
2007/0090690 A1 4/2007 Ohkubo
(Continued)

FOREIGN PATENT DOCUMENTS

JP 09-11875 A 1/1997
JP 2002-316631 A 10/2002
(Continued)

OTHER PUBLICATIONS

Shu-Liang et al.., Experimental study and numerical simulation of vibration control energy transducer, 2010, ieee, p. 1-4 (Year: 2010).*
(Continued)

*Primary Examiner* — McDieunel Marc
(74) *Attorney, Agent, or Firm* — Buchanan Ingersoll & Rooney PC

(57) ABSTRACT

The hydraulic pressure control device controls a valve part for adjusting the inflow/outflow of a fluid into and out of a hydraulic pressure chamber formed in a braking device to control the actual hydraulic pressure of the fluid in the hydraulic pressure chamber, to a target hydraulic pressure of the actual hydraulic pressure and includes a determination unit which determines whether a response delay time of the actual hydraulic pressure is equal to or greater than a
(Continued)

prescribed permitted delay time and an inflow/outflow quantity correction unit which executes increase correction processing in which the valve part is controlled to increase the inflow/outflow quantity of the fluid in the hydraulic pressure chamber when the determination unit has determined that the response delay time is equal to or greater than the permitted delay time.

6 Claims, 5 Drawing Sheets

(51) Int. Cl.
*B60T 13/14* (2006.01)
*B60T 7/04* (2006.01)
*B60T 13/66* (2006.01)
*F15B 13/042* (2006.01)

(52) U.S. Cl.
CPC ............ *B60T 13/662* (2013.01); *B60T 13/68* (2013.01); *B60T 13/686* (2013.01); *F15B 13/0426* (2013.01); *B60T 13/142* (2013.01)

(58) Field of Classification Search
CPC ... B60T 13/686; B60T 13/142; F15B 13/0426
See application file for complete search history.

(56) References Cited

U.S. PATENT DOCUMENTS

| | | | |
|---|---|---|---|
| 2007/0252428 | A1 | 11/2007 | Okano et al. |
| 2013/0207451 | A1* | 8/2013 | Ohkubo ................ B60T 8/3655 303/9.62 |
| 2015/0102658 | A1* | 4/2015 | Ohkubo ................ B60T 8/3655 303/6.01 |
| 2015/0175145 | A1 | 6/2015 | Nakata et al. |
| 2016/0339889 | A1 | 11/2016 | Okano et al. |
| 2016/0347297 | A1 | 12/2016 | Ninoyu et al. |
| 2017/0120882 | A1 | 5/2017 | Ninoyu et al. |
| 2018/0345925 | A1* | 12/2018 | Ninoyu ..................... B60T 8/36 |

FOREIGN PATENT DOCUMENTS

| | | |
|---|---|---|
| JP | 2007-112293 A | 5/2007 |
| JP | 2007-296924 A | 11/2007 |
| JP | 2007-326517 A | 12/2007 |
| JP | 2013-049292 A | 3/2013 |
| JP | 2013-111998 A | 6/2013 |
| JP | 2015-120397 A | 7/2015 |
| JP | 2015-143060 A | 8/2015 |
| JP | 2015-182639 A | 10/2015 |
| JP | 2015-182640 A | 10/2015 |
| WO | 2015/111440 A1 | 7/2015 |

OTHER PUBLICATIONS

Yuang et al., Simulation study of a two-stroke Single Piston Hydraulic Free Piston Engine, 2008, IEEE, p. 1244-1249 (Year: 2008).*
Gao et al., Electro-hydraulic proportional pressure control system of hydraulic machine, 2012, IEEE, p. 370-373 (Year: 2012).*
Houhua et al., Active pressure boosting based electro-hydraulic braking control for electric vehicle, 2016, IEEE, p. 8902-8907 (Year: 2016).*
Office Action (Notification of Reasons for Refusal) dated Apr. 10, 2018, by the Japanese Patent Office in corresponding Japanese Patent Application No. 2015-194735, and an English Translation of the Office Action. (6 pages).
International Search Report (PCT/ISA/210) dated Dec. 6, 2016, by the Japanese Patent Office as the International Searching Authority for International Application No. PCT/JP2016/078589.
Written Opinion (PCT/ISA/237) dated Dec. 6, 2016, by the Japanese Patent Office as the International Searching Authority for International Application No. PCT/JP2016/078589.
Office Action (Decision of Refusal) dated Nov. 27, 2018, by the Japanese Patent Office in corresponding Japanese Patent Application No. 2015-194735 and an English Translation of the Office Action. (4 pages).

* cited by examiner

HYDRAULIC PRESSURE CONTROL DEVICE

TECHNICAL FIELD

This invention relates to a hydraulic pressure control device.

BACKGROUND ART

In a brake device for a vehicle, a hydraulic pressure control device is used for a device which controls a valve portion (for example, an electromagnetic valve) so that the hydraulic pressure (actual hydraulic pressure) in the hydraulic pressure chamber associated with the braking force approximates the target hydraulic pressure which is set in response to the braking operation by a driver of the vehicle. According to a generally used hydraulic pressure control device, a feed-back control is adopted which controls the flow-rate of the valve portion based on the difference between the actual hydraulic pressure and the target hydraulic pressure. In such feed-back control, a control constant is set for restricting the fluid amount (fluid inflow or fluid outflow amount) flowing into or out of the hydraulic pressure chamber. The control constant is normally set to the maximum value that can assure the control stability. Such hydraulic pressure control of the brake device for a vehicle is shown in, for example, a patent publication No. JP 2002-316631A.

CITATION LIST

Patent Literature

[Patent Literature 1] JP2002-316631 A

SUMMARY OF INVENTION

Technical Problem(s)

However, according to the hydraulic pressure control device as explained above, in not a few cases, a drawback that a sufficient fluid inflow or outflow amount may not be outputted due to a variation or deviation of the hardware (for example, variation of operation of the valve portion) arises. In a case where a sufficient amount of inflow or outflow fluid cannot be assured, a large response delay may occur. However, if the control constant is increased for increasing the fluid inflow or outflow amount, an issue that affects the control stability may occur.

Accordingly, this invention was made in consideration with the above-mentioned situation and the invention pertains to provide a hydraulic pressure control device which can assure a sufficient amount of inflow or outflow fluid to cope with the deviation or variation of the hardware, well keeping the control stability.

Solution to Problem(s)

The hydraulic pressure control device according to the invention controls a valve portion which adjusts a fluid flowing into or flowing out of a hydraulic pressure chamber so that an actual hydraulic pressure of the fluid, i.e., a hydraulic pressure of the fluid in the hydraulic pressure chamber formed in a braking device becomes a target hydraulic pressure which is a target value of the actual hydraulic pressure of the fluid, wherein the hydraulic pressure control device includes a judging portion which judges whether or not a response delay time of the actual hydraulic pressure with respect to the target hydraulic pressure is equal to or more than a predetermined allowable delay time and an inflow or outflow amount correcting portion which executes an increase correction processing which increases the inflow or outflow amount of the fluid with respect to the hydraulic pressure chamber corresponding to a difference between the actual hydraulic pressure and the target hydraulic pressure by a control of the valve portion, when the judging portion judges that the response delay time is equal to or more than the predetermined allowable delay time.

Effect of Invention

According to the invention, by judging whether the response delay time of the actual hydraulic pressure relative to the target hydraulic pressure is equal to or more than a predetermined allowable delay time, the response delay time that is longer than an expected time due to a deviation in the hardware or the like can be detected and thus, the timing of increasing the inflow or outflow amount can be properly judged, thereby to be able to provide timely an increased fluid flowing into and flowing out of the hydraulic pressure chamber, in response to the deviation of the hardware or the like. In other words, according to the invention, a fluid inflow or outflow amount can be assured, which is sufficient considering a deviation in the hardware, while keeping a control stability.

BRIEF EXPLANATION OF ATTACHED DRAWINGS

EMBODIMENTS FOR IMPLEMENTING INVENTION

Figure 1:
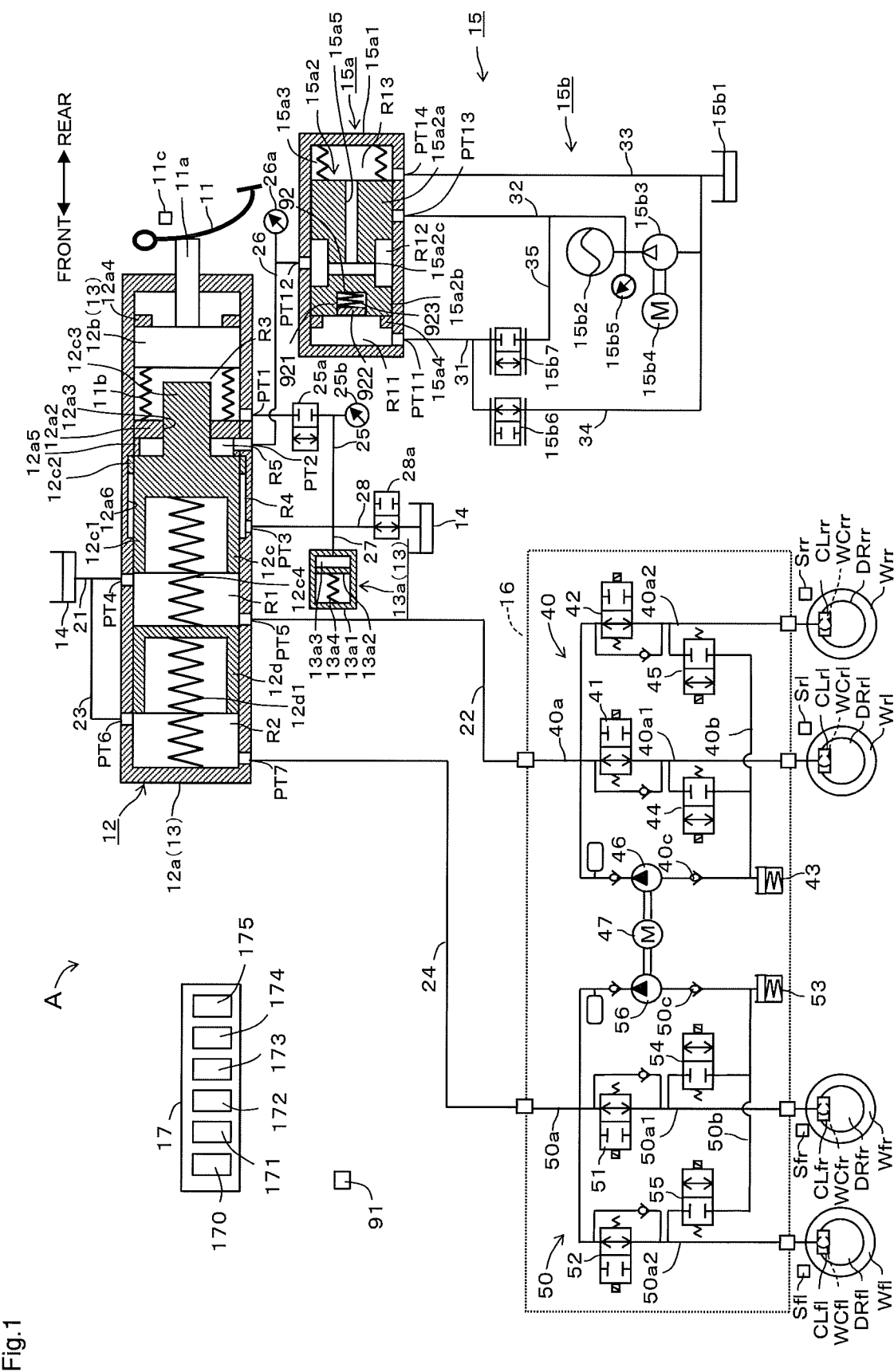
FIG. 1 is an outline schematic view of a hydraulic pressure control device according to one embodiment of the invention.

The embodiment of the hydraulic pressure control device according to one embodiment of the invention adapted to a vehicle will be explained hereinafter with reference to the attached drawings. The vehicle is equipped with a hydraulic pressure braking force generating device A (corresponding to the braking device) which applies hydraulic pressure braking force directly to each vehicle wheel Wfl, Wfr, Wrl and Wrr (in some case, collectively referred to as "W") to apply brakes to the vehicle. The hydraulic pressure braking force generating device A includes a brake pedal 11, a master cylinder 12, a stroke simulator portion 13, a reservoir 14, a booster mechanism 15, an actuator 16, a brake ECU 17 (corresponding to the hydraulic pressure control device) and wheel cylinders WCrl, WCrr, WCfr and WCfl (in some case, collectively referred to as "WC"), as shown in FIG. 1. The hydraulic pressure braking force generating device A corresponds to a brake system.

The wheel cylinder WC restricts the rotation of the respective wheels W and is disposed in the caliper CL. The wheel cylinder WC serves as a braking force applying mechanism which applies braking force to the wheels W of the vehicle based on the pressure (brake hydraulic pressure) of the brake fluid (corresponding to "fluid") from the actuator 16. When the brake hydraulic pressure is supplied to the wheel cylinder WC, each piston (not shown) in each wheel cylinder WC pushes a pair of brake pads (not shown) which serves as a friction member and squeezes a disc rotor DR which serves as a rotational member rotating unitary with the wheel W from both sides thereof to thereby restrict the rotation of the rotor DR. It is noted here that in this embodiment, a disc type brake device is used but a drum type brake device may be used.

The brake pedal 11 corresponds to the brake operating member and is connected to the stroke simulator portion 13 and the master cylinder 12 via an operation rod 11a. A stroke sensor 11c which detects a brake pedal stroke (operation amount) by depression of the brake pedal 11 is provided in the vicinity of the brake pedal 11. The brake ECU 17 is connected to this stroke sensor 11c and the detected signal (detection result) is outputted to the brake ECU 17.

The master cylinder 12 supplies the actuator 16 with the brake fluid in response to the stroke of the brake pedal 11 and is formed by a cylinder body 12a, an input piston 12b, a first master piston 12c and a second master piston 12d, etc.

The cylinder body 12a is formed in a substantially bottomed cylinder shape housing having a bottom surface closed. The cylinder body 12a includes therein a partition wall portion 12a2 which extends inwardly with a shape of flange at the inner peripheral side of the cylinder body 12a. A through-hole 12a3 is formed at the central portion of the partition wall portion 12a2 and is penetrating therethrough in a front/rear direction. The cylinder body 12a is provided with a first master piston 12c and a second master piston 12d at an inner peripheral portion thereof at a portion further front side than the partition wall portion 12a2. The first master piston 12c and the second master piston 12d are liquid-tightly movable in an axial direction in the cylinder body 12a.

The cylinder body 12a is provided with an input piston 12b at an inner peripheral portion thereof at a portion further rear side than the partition wall portion 12a2. The input piston 12b is liquid-tightly movable in an axial direction in the cylinder body 12a. The input piston 12b slidably moves within the cylinder body 12a in response to the operation of the brake pedal 11.

The operating rod 11a which is operable in association with the brake pedal 11 is connected to the input piston 12b. The input piston 12b is biased in a direction where the volume of the first hydraulic pressure chamber R3 expands, i.e., in a rearward direction (right direction as viewed in the drawing) by means of a compression spring 11b. When the brake pedal 11 is depressed, the operating rod 11a advances forward overcoming the biasing force of the compression spring 11b. By this advance movement of the operating rod 11a, the input piston 12b advances in association with the movement of the operating rod 11a. When the depression operation of the brake pedal 11 is released, the input piston 12b retreats by the biasing force of the compression spring 11b and is brought into contact with a restriction projecting portion 12a4 for positioning.

The first master piston 12c includes a pressurizing cylindrical portion 12c1, a flange portion 12c2 and a projecting portion 12c3 in order from the front and these portions are formed integrally as a unit. The pressurizing cylindrical portion 12c1 is formed in a substantially bottomed cylinder shape having an opening at a front portion thereof and a bottom wall at a rear portion thereof. The pressurizing cylindrical portion 12c1 is liquid-tightly movably provided in the inner peripheral surface of the cylinder body 12a. A coil spring-shaped biasing member 12c4 is provided in the inner space of the pressurizing cylindrical portion 12c1 between the first master piston 12c and the second master piston 12d. The first master piston 12c is biased in a rear direction by the coil spring 12c4. In other words, the first master piston 12c is biased by the coil spring 12c4 in a rearward direction and is finally brought into contact with a restriction projecting portion 12a5 for positioning. This position is defined to be the initial position (predetermined position) at the time the depression operation of the brake pedal 11 is released.

The flange portion 12c2 is formed to have a larger diameter than the diameter of the pressurizing cylindrical portion 12c1 and is liquid-tightly and slidably disposed on an inner peripheral surface of a large diameter portion 12a6 in the cylinder body 12a. The projecting portion 12c3 is formed to have a smaller diameter than the diameter of the pressurizing cylindrical portion 12c1 and is slidably in liquid-tightly provided on the through hole 12a3 of the partition wall portion 12a2. The rear end portion of the projecting portion 12c3 projects into an inner space of the cylinder body 12a, passing through the through hole 12a3 and is separated from the inner peripheral surface of the cylinder body 12a. The rear end surface of the projecting portion 12c3 is separated from the bottom wall of the input piston 12b and the separation distance is formed to be variable.

The second master piston 12d is arranged in the cylinder body 12a at a front side relative to the first master piston 12c. The second master piston 12d is formed in a substantially bottomed cylinder shape having an opening at a front portion thereof. A coil spring 12d1 which serves as a biasing member is disposed in the inner space of the second master piston 12d between the second piston 12d and a closed inner bottom surface of the cylinder body 12a. The second master piston 12d is biased by the coil spring 12d1 in a rearward direction. In other words, the second master piston 12d is biased by the coil spring 12d1 towards a predetermined initial position.

The master cylinder 12 is formed by a first master chamber R1, a second master chamber R2, a first hydraulic pressure chamber R3, a second hydraulic pressure chamber R4 and a servo chamber (corresponding to the hydraulic pressure chamber) R5. The first master chamber R1 is defined by the inner peripheral surface of the cylinder body 12a, the first master piston 12c (front side of the pressurizing cylindrical portion 12c1) and the second master piston 12d. The first master chamber R1 is connected to the reservoir 14 via the hydraulic passage 21 which is connected to the port PT4. Further, the first master chamber R1 is connected to the hydraulic passage 40a (actuator 16) via the hydraulic passage 22 which is connected to the port PT5.

The second master chamber R2 is defined by the inner peripheral surface of the cylinder body 12a and the front side of the second master piston 12d. The second master chamber R2 is connected to the reservoir 14 via the hydraulic passage 23 which is connected to the port PT6. Further, the second master chamber R2 is connected to the hydraulic passage 50a (actuator 16) via the hydraulic passage 24 which is connected to the port PT7.

The first hydraulic pressure chamber R3 is formed between the partition wall portion 12a2 and the input piston 12b and is defined by the inner peripheral surface of the cylinder body 12a, the partition wall portion 12a2, the projecting portion 12c3 of the first master piston 12c and the input piston 12b. The second hydraulic pressure chamber R4 is formed at the side of the pressurizing cylindrical portion 12c1 of the first master piston 12c and is defined by the large diameter portion 12a6 of the cylinder body 12a, the pressurizing cylindrical portion 12c1 and the flange portion 12c2. The first hydraulic pressure chamber R3 is connected to the second hydraulic pressure chamber R4 via the hydraulic passage 25 which is connected to the port PT1 and the port PT3.

The servo chamber R5 is formed between the partition wall portion 12a2 and the pressurizing cylindrical portion 12c1 of the first master piston 12c and is defined by the inner peripheral surface of the cylinder body 12a, the partition wall portion 12a2, the projecting portion 12c3 of the first master piston 12c and the pressurizing cylindrical portion 12c1. The servo chamber R5 is connected to an output chamber R12 via the hydraulic passage 26 which is connected to the port PT2.

The pressure sensor 26a is a sensor that detects the servo pressure which is supplied to the servo chamber R5 and is connected to the hydraulic passage 26. The pressure sensor 26a sends the detection signal (detection result) to the brake ECU 17. The servo pressure detected by the pressure sensor 26a is an actual value of the hydraulic pressure in the servo chamber R5 and hereinafter this pressure is named as the actual servo pressure (corresponding to the "actual hydraulic pressure").

The stroke simulator portion 13 is formed by the cylinder body 12a, the input piston 12b, the first hydraulic pressure chamber R3 and a stroke simulator 13a which is in fluid communication with the first hydraulic pressure chamber R3. The first hydraulic pressure chamber R3 is in fluid communication with the stroke simulator 13a via the hydraulic passages 25 and 27 which are connected to the port PT1. It is noted that the first hydraulic pressure chamber R3 is in fluid communication with the reservoir 14 via a connection passage (not shown).

The stroke simulator 13a generates on the brake pedal 11 a reaction force which magnitude depends on the operation state of the brake pedal 11. The stroke simulator 13a is formed by a cylindrical portion 13a1, a piston portion 13a2, a reaction force hydraulic pressure chamber 13a3 and a spring 13a4. The piston portion 13a2 liquid-tightly slidably moves within the cylindrical portion 13a1 in response to the braking operation by the brake pedal 11. The reaction force hydraulic pressure chamber 13a3 is formed between and defined by the cylindrical portion 13a1 and the piston portion 13a2. The reaction force hydraulic pressure chamber 13a3 is in fluid communication with the first hydraulic pressure chamber R3 and the second hydraulic pressure chamber R4 via the hydraulic passages 27 and 25. The spring 13a4 biases the piston portion 13a2 in a direction where the volume of the reaction force hydraulic pressure chamber 13a3 decreases.

It is noted that the first control valve 25a which is a normally closed type electromagnetic valve is disposed in the hydraulic passage 25. The second control valve 28a which is a normally open type electromagnetic valve is disposed in the hydraulic passage 28 which connects the hydraulic passage 25 and the reservoir 14. When the first control valve 25a is in a closed state, the fluid communication between the first and the second hydraulic pressure chambers R3 and R4 is interrupted. This fluid communication interruption keeps the constant separation distance between the input piston 12b and the first master piston 12c to allow the coordinative movement therebetween. Further, when the first control valve 25a is in an open state, the fluid communication between the first hydraulic pressure chamber R3 and the second hydraulic pressure chamber R4 is established. Thus, the volume change of the first and the second hydraulic pressure chambers R3 and R4 caused by the advance or retreat movement of the first master piston 12c can be absorbed by the transfer of the brake fluid.

The pressure sensor 25b is a sensor that detects the reaction force hydraulic pressure in the second hydraulic pressure chamber R4 and the first hydraulic pressure chamber R3 and is connected to the hydraulic passage 25. The pressure sensor 25b detects the pressure in the second hydraulic pressure chamber R4 when the first control valve 25a is in a closed state and also detects the pressure (or the reaction force hydraulic pressure) in the first hydraulic pressure chamber R3 which is in fluid communication with the second hydraulic pressure chamber R4 when the first control valve 25a is in an open state. The pressure sensor 25b sends the detection signal (detection result) to the brake ECU 17.

The booster mechanism 15 generates a servo pressure in response to the stroke of the brake pedal 11. The booster mechanism 15 is a hydraulic pressure generating device which outputs an output pressure (in this embodiment, the servo pressure) by the operation of the inputted input pressure (in this embodiment, the pilot pressure) and generates a response delay in which the change of the output pressure relative to the change of the input pressure is delayed at the initial stage of starting of the pressure increasing operation or the pressure decreasing operation when the output pressure is intended to be increasing or decreasing. The booster mechanism 15 includes a regulator 15a and a pressure supply device 15b. The regulator 15a is configured to have a cylinder body 15a1 and a spool 15a2 which slides in the cylinder body 15a1. The regulator 15a includes the pilot chamber R11, the output chamber R12 and the hydraulic pressure chamber R13.

The pilot chamber R11 is defined by the cylinder body 15a1 and a front end surface of a second large diameter portion 15a2b of the spool 15a2. The pilot chamber R11 is connected to the pressure decreasing valve 15b6 and the pressure increasing valve 15b7 (hydraulic passage 31) which are connected to the port PT11. A restriction projecting portion 15a4 is provided on the inner peripheral surface of the cylinder body 15a1 to position the spool 15a2 by contacting the front end surface of the second large diameter portion 15a2b with the restriction projecting portion 15a4.

The output chamber R12 is defined by the cylinder body 15a1 and the small diameter portion 15a2c of the spool 15a2, the rear end surface of the second large diameter portion 15a2b and the front end surface of the first large diameter portion 15a2a. The output chamber R12 is connected to the servo chamber R5 of the master cylinder 12 via the hydraulic passage 26 which is connected to the port PT12 and the port PT2. Further, the output chamber R12 is connectible with the accumulator 15b2 via the hydraulic passage 32 which is connected to the port PT13.

The hydraulic pressure chamber R13 is defined by the cylinder body 15a1 and the rear end surface of the first large diameter portion 15a2a of the spool 15a2. The hydraulic pressure chamber R13 is connectible with the reservoir 15b1 via the hydraulic passage 33 which is connected to the port PT14. A spring 15a3, which biases the spool 15a2 in a direction where the volume of the hydraulic pressure chamber R13 increases, is disposed in the hydraulic pressure chamber R13.

The spool 15a2 is formed by the first large diameter portion 15a2a, the second large diameter portion 15a2b and the small diameter portion 15a2c. The first large diameter portion 15a2a and the second large diameter portion 15a2b are structured to be liquid-tightly movable within the cylinder body 15a1. The small diameter portion 15a2c is arranged between the first large diameter portion 15a2a and the second large diameter portion 15a2b and is formed integrally therewith as a unit. The small diameter portion 15a2c is formed to have a diameter smaller than the first large diameter portion 15a2a and the second large diameter portion 15a2b. Further, a communication passage 15a5 which connects the output chamber R12 and the hydraulic pressure chamber R13 is formed in the spool 15a2.

The pressure supply device 15b also serves as a drive portion which drives the spool 15a2. The pressure supply device 15b includes a reservoir 15b1 which is a low pressure source, an accumulator 15b2 which is a high pressure source that accumulates the brake fluid, a pump 15b3 which pumps the brake fluid from the reservoir 15b1 into the accumulator 15b2 and an electric motor 15b4 which drives the pump 15b3. The reservoir 15b1 is exposed to the atmospheric pressure and the hydraulic pressure in the reservoir 15b1 is the same level with the atmospheric pressure. The pressure in the low pressure source is lower than the pressure in the high pressure source. The pressure supply device 15b is provided with a pressure sensor 15b5 which detects the pressure of the brake fluid supplied from the accumulator 15b2 and outputs the detected result to the brake ECU 17.

Further, the pressure supply device 15b is provided with a pressure decreasing valve 15b6 and the pressure increasing valve 15b7. The pressure decreasing valve 15b6 is a normally open type electromagnetic valve which opens in a non-energized state. The flow-rate of the pressure decreasing valve 15b6 is controlled by the instructions from the brake ECU 17. One side of the pressure decreasing valve 15b6 is connected to the pilot chamber R11 via the hydraulic passage 31 and the other side thereof is connected to the reservoir 15b1 via the hydraulic passage 34. The pressure increasing valve 15b7 is a normally closed type electromagnetic valve which closes in a non-energized state. The flow-rate of the pressure increasing valve 15b7 is controlled by the instructions from the brake ECU 17. One side of the pressure increasing valve 15b7 is connected to the pilot chamber R11 via the hydraulic passage 31 and the other side thereof is connected to the accumulator 15b2 via the hydraulic passage 35 and the hydraulic passage 32 which is connected to the hydraulic passage 35.

The operation of the regulator 15a will be explained briefly hereinafter. In the case where the pilot pressure is not supplied to the pilot chamber R11 from the pressure decreasing valve 15b6 and the pressure increasing valve 15b7, the spool 15a2 is positioned at the initial position by means of a biasing force of the spring 15a3 (See FIG. 1). The initial position of the spool 15a2 is determined by the contact of the front end surface of the spool 15a2 with the restriction projecting portion 15a4. This initial position is the position immediately before the rear end surface of the spool 15a2 closes the port PT14. As explained, when the spool 15a2 is in the initial position, the port PT14 and the port PT12 are in fluid communication with each other through the communication passage 15a5 and at the same time the port PT13 is closed by the spool 15a2.

In the case where the pilot pressure formed by the pressure decreasing valve 15b6 and the pressure increasing valve 15b7 increases in response to the brake pedal 11 operation, the spool 15a2 moves in a rearward direction (right side in FIG. 1), overcoming the biasing force of the spring 15a3. The spool 15a2 moves to the position where the port PT13, which had been closed by the spool 15a2, opens. The port PT14 which had been in the open state, is closed by the spool 15a2. The position of the spool 15a2 under this state is defined to be the "pressure increasing position". At this position, the rear end surface of the second large diameter portion 15a2b of the spool 15a2 receives a force corresponding to the servo pressure (Pressure increasing operation).

By the force balance between the pushing force at the front end surface of the second large diameter portion 15a2b2 of the spool 15a2 and the force corresponding to the servo pressure, the position of the spool 15a2 is fixed. This position of the spool 15a2 is defined to be the "holding position". The port PT13 and the port PT14 are closed by the spool 15a2. (Holding operation).

In the case where the pilot pressure formed by the pressure decreasing valve 15b6 and the pressure increasing valve 15b7 decreases in response to the stroke of the brake pedal 11 operation, the spool 15a2 which is in the holding position now moves in a frontward direction by the biasing force of the spring 15a3. Then, the port PT13 which had been in the closed state by the spool 15a2 keeps the closed state. The port PT14 which had been in the closed state is open. The position of the spool 15a2 at this state is defined to be the "pressure decreasing position". Under this state, the port PT14 and the port PT12 are in fluid communication with each other through the communication passage 15a5 (Pressure decreasing operation).

The above explained booster mechanism 15 generates a pilot pressure in response to a stroke of the brake pedal 11 by the pressure decreasing valve 15b6 and the pressure increasing valve 15b7 and generates a servo pressure which responds to the stroke of the brake pedal 11 by the pilot pressure. The generated servo pressure is supplied to the servo chamber R5 of the master cylinder 12 and the master cylinder 12 supplies the wheel cylinder WC with the master pressure generated in response to the stroke of the brake pedal 11. The pressure decreasing valve 15b6 and the pressure increasing valve 15b7 form a valve portion which adjusts the inflow or outflow of the brake fluid into or out of the servo chamber R5.

The actuator 16 is a device which adjusts the brake hydraulic pressure to be applied to each wheel cylinder WC and a first conduit system 40 and a second conduit system 50 are provided as a dual brake system. The first conduit system 40 controls the brake hydraulic pressure to be applied to the left rear wheel Wrl and the right rear wheel Wrr and the second conduit system 50 controls brake hydraulic pressure applied to the right front wheel Wfr and the left front wheel Wfl. In other words, the conduit system is a front/rear conduit brake system.

The hydraulic pressure supplied from the master cylinder 12 is transmitted to the respective wheel cylinders WCrl, WCrr, WCfr and WCfl through the conduit systems 40 and 50. In the first conduit system, the hydraulic passage 40a is disposed which connects the hydraulic passage 22 and the wheel cylinders WCrl, WCrr and in the second conduit system 50, the hydraulic passage 50a is disposed which connects the hydraulic passage 24 and the wheel cylinders WCfr, WCfl. Through these hydraulic passages 40a and 50a, the hydraulic pressure supplied from the master cylinder 12 is transmitted to the wheel cylinders WCrl, WCrr, WCfr and WCfl.

The hydraulic passages 40a and 50a are branched to two passages, 40a1 and 40a2 and 50a1 and 50a2, respectively. In the branched hydraulic passages 40a1 and 50a1, the first pressure increasing control valves 41 and 51 which control increasing of the brake hydraulic pressure to the wheel cylinders WCrl and WCfr are disposed respectively and in the branched hydraulic passages 40a2 and 50a2, the second pressure increasing valves 42 and 52 which control increasing of the brake hydraulic pressure to the wheel cylinders WCrr and WCfl, are disposed respectively.

These first pressure increasing valves 41, 42 and the second pressure increasing valves 51, 52 are formed by a two-position electromagnetic valve which can control the valve state to the communication state and the interrupted state. The first pressure increasing valves 41, 42 and the second pressure increasing valves 51, 52 are formed by a normally open type valve which controls the valve state such that when the control current to the solenoid coil provided in the first pressure increasing valves 41, 42 and the second pressure increasing valves 51, 52 is zero value (non-energized state), the valve becomes in a fluid communication state and when the control current to the solenoid coil flows (energized state), the valve becomes in a fluid interrupted state.

The passage portions between the first and the second pressure increasing valves 41, 42 and 51, 52 and the wheel cylinders WCrl, WCrr and WCfr, WCfl in the hydraulic passages 40a, 50a are connected to the reservoirs 43, 53 via the hydraulic passage 40b, 50b as a pressure decreasing hydraulic passage, respectively. The first pressure decreasing control valves 44, 45 and the second pressure decreasing control valves 54, 55 which are formed by a two-position electromagnetic valve which can control the valve state to the communication state and the interrupted state, are disposed in the hydraulic passages 40b, 50b, respectively. The first pressure decreasing valves 44, 45 and the second pressure decreasing valves 54, 55 are formed by a normally closed type valve which controls the valve state such that when the control current to the solenoid coil provided in the first pressure decreasing valves 44, 45 and the second pressure decreasing valves 54, 55 is zero value (non-energized state), the valve becomes in a fluid interrupted state and when the control current to the solenoid coil flows (energized state), the valve becomes in a fluid communication state.

The hydraulic passages 40c and 50c, which are the return hydraulic passages, are provided between the reservoirs 43, 53 and the main hydraulic passages, the hydraulic passages 40a and 50a and in the return hydraulic passages 40c and 50c, the pumps 46 and 56 are disposed which are driven by the motor 47 which suctions or discharges the brake fluid from the reservoirs 43, 53 towards the master cylinder 12 side or towards the wheel cylinders WCrl, WCrr and WCfr, WCfl side.

The pumps 46, 56 suctions the brake fluid from the reservoirs 43, 53 and discharges the same to the hydraulic passages 40a, 50a thereby to supply the wheel cylinder WCrl, WCrr and WCfr, WCfl side with the brake fluid.

The brake ECU 17 is structured such that the detection signals from the wheel speed sensors Sfl, Srr, Sfr and Srl which are provided at the respective vehicle wheels Wfl, Wrr, Wfr and Wrl are inputted thereto. The brake ECU 17 calculates the wheel speed of the respective wheels, a presumed vehicle speed and the slip ratio, etc., based on the detection signals from the wheel speed sensors Sfl, Srr, Sfr and Srl. The brake ECU 17 executes anti-skid control based on the calculation result.

Various controls using the actuator 16 are executed at the brake ECU 17. For example, the brake ECU 17 outputs the control current that controls the various control valves 41, 42, 44, 45, 51, 52, 54 and 55 and the motor 47 which drives pumps provided in the actuator 16 to control the hydraulic pressure circuit in the actuator 16 to thereby independently control the respective wheel cylinder pressure transmitted to the wheel cylinders WCrl, WCrr, WCfr and WCfl. For example, the brake ECU 17 executes the anti-skid control which prevents the wheels from locking by executing pressure decreasing, pressure increasing and holding operations when the vehicle wheels are about to slip in a braking operation, or executes a sideslip prevention control which turns the vehicle with an ideal locus by suppressing the sideslip tendency (under steer or over steer tendency) by automatically pressurizing the wheel cylinder pressure of the control subject wheel. The actuator 16 may serve as an ABS system (anti-lock brake system). It is noted that a predetermined dead zone is provided in the target servo pressure.

(Increase Correction Processing)

The brake ECU 17 includes a control portion 170, an allowable delay time setting portion 171, a judging portion 172, an inflow or outflow amount correcting portion 173, a temperature presuming portion 174 and a rigidity judging portion 175. The control portion 170 determines the inflow or outflow amount (hereinafter, referred to simply as "flow amount") of the brake fluid flowing into or out of the servo pressure R5 in response to the difference in pressure between the actual servo pressure which corresponds to the value of the pressure sensor 26a and the target servo pressure (corresponding to the "target hydraulic pressure") determined in response to the operation of the brake pedal 11. The control portion 170 controls the pressure decreasing valve 15b6 and the pressure increasing valve 15b7 in response to the determined flow amount (corresponding to the later described "target flow amount"). In more detail, the control portion 170 sends an FF signal which corresponds to the target servo pressure and an FB signal which corresponds to the difference between the actual servo pressure and the target servo pressure to the pressure decreasing valve 15b6 and the pressure increasing valve 15b7. In other words, the control portion 170 outputs the control signal (FF signal+FB signal) which corresponds to a flow amount to be actually realized to the pressure decreasing valve 15b6 and the pressure increasing valve 15b7. The control portion 170 controls the flow amount of the brake fluid flowing into or out of the servo chamber R5 by controlling the flow amount of the brake fluid flowing into or out of the pilot chamber R11. It is noted here that the electric current energizing the pressure increasing valve 15b7 by the control portion 170 corresponds to the sum of the valve opening current which is the minimum current that can open the electromagnetic valve and the control current which corresponds to the control signal.

Figure 2:
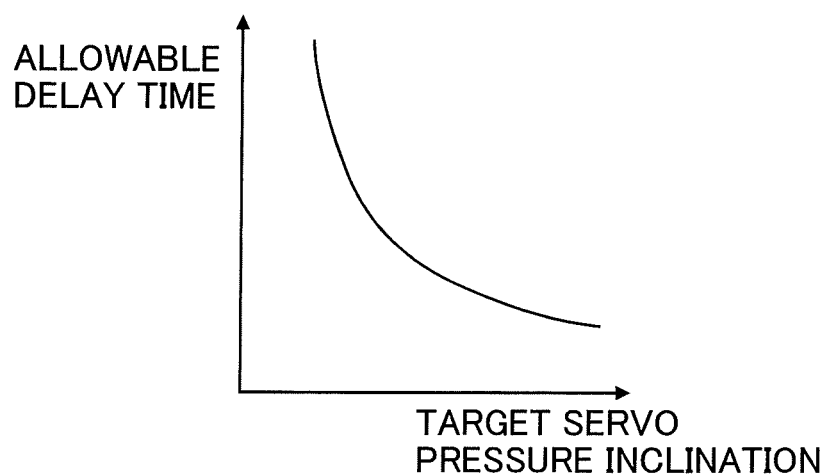
FIG. 2 is an explanatory view explaining a relationship between the inclination of the target servo pressure and the allowable delay time (map) according to the embodiment.

The allowable delay time setting portion 171 sets the allowable value (allowable delay time) of the response delay time for the actual servo pressure relative to the target servo pressure. For example, when the target servo pressure increases from the constant pressure state and the actual servo pressure increases from the constant pressure state in response to the increase of the target servo pressure, the "response delay time" is defined to be the time period from the increase of the target servo pressure starts to the increase of the actual servo pressure starts. The allowable delay time setting portion 171 calculates the inclination of the target servo pressure (change amount per unit time) and sets the allowable delay time based on the calculated inclination of the target servo pressure. As shown in FIG. 2, the allowable delay time setting portion 171 sets the allowable delay time such that the larger the change amount (inclination) per unit time of the target servo pressure, the shorter the allowable delay time is set. As stated above, the larger the inclination of the target servo pressure, the shorter the allowable delay time is set.

Figure 3:
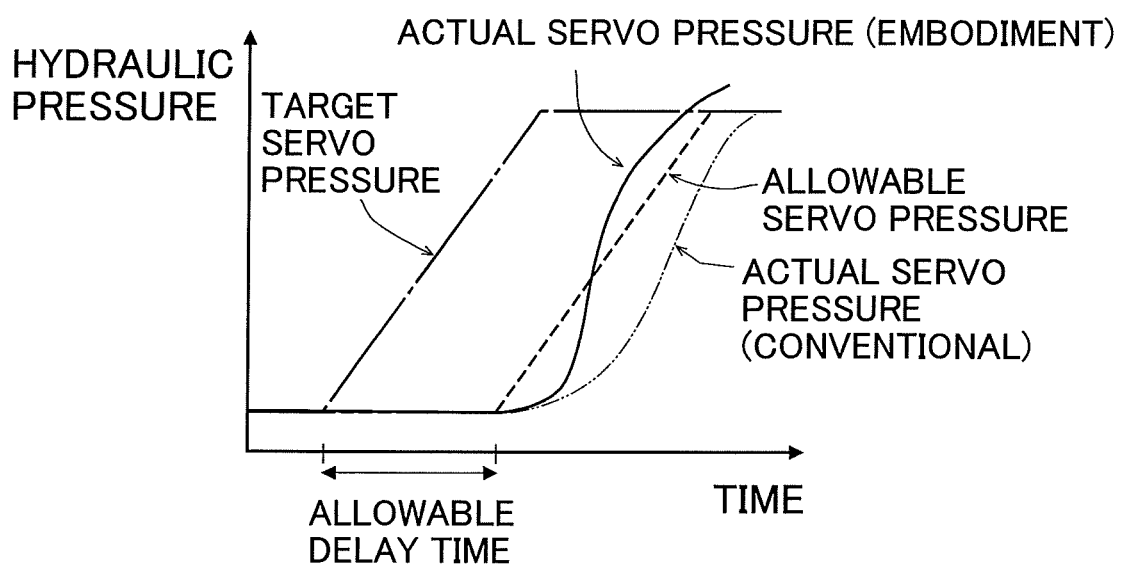
FIG. 3 is an explanatory view explaining an increase correction processing according to the embodiment.

The judging portion 172 judges whether or not the response delay time of the actual servo pressure relative to the target servo pressure is equal to or more than the allowable delay time (corresponding to the "predetermined allowable delay time") set by the allowable delay time setting portion 171. In detail, the judging portion 172 calculates a threshold value per unit time (allowable servo pressure) of the actual servo pressure from the allowable delay time set by the allowable delay time setting portion 171 in the judgment. Explaining differently, the judging portion 172 calculates the threshold value of the actual servo pressure at each time (allowable servo pressure) from the target servo pressure and the allowable delay time. The threshold value of the time (allowable delay time) can be converted into the threshold value of the pressure in the relationship between the time and the pressure. For example, as shown in FIG. 3, in the relationship between the servo pressure and the time, the allowable servo pressure is set to a value of the target servo pressure shifted by the allowable delay time to the right side in FIG. 3 (in a direction where the time gains). Accordingly, the allowable servo pressure may be the minimum actual servo pressure that can be allowed relative to the target servo pressure when the allowable delay time passed from a certain time point of the target servo pressure.

The judging portion 172 judges whether or not the actual servo pressure (value of the pressure sensor 26a) is less than the allowable servo pressure. The fact that the actual servo pressure is less than the allowable servo pressure means that the value of the actual servo pressure is not sufficient after the allowable delay time passed from a certain time point of the target servo pressure. In other words, the judging portion 172 judges that the response delay time is equal to or more than the allowable delay time when the actual servo pressure is less than the allowable servo pressure. Oppositely, when the actual servo pressure is equal to or more than the allowable servo pressure, the judging portion 172 judges that the response delay time is less than the allowable delay time. The judging portion 172 executes such judgement every predetermined time period.

The inflow or outflow amount correcting portion 173 increases the "inflow or outflow amount of the brake fluid flowing into or out of the servo chamber R5 (later explained target flow amount)" corresponding to the difference in pressure between the actual servo pressure and the target servo pressure by the control of the pressure decreasing valve 15b6 and the pressure decreasing valve 15b7, when the response delay time is judged to be equal to or more than the allowable delay time by the judging portion 172. In other words, the inflow or outflow amount correcting portion 173 corrects the control signal (control electric current) set at the control portion 170 such that the inflow amount of the brake fluid flowing into the servo chamber R5 or the outflow amount of the brake fluid flowing out of the servo chamber R5 increases when the response delay time is judged to be equal to or more than the allowable delay time. Such processing of the increasing of flow amount is defined to be the "increase correction processing". The inflow or outflow amount correcting portion 173 executes the increase correction processing which corrects the inflow or outflow amount instructed by the control portion 170 in response to the judgement result by the judging portion 172.

In detail, first, the inflow or outflow amount correcting portion 173 calculates the current presumed flow amount (flow rate per unit time) relative to the servo chamber R5. The presumed flow amount can be calculated by dividing the inclination of the actual servo pressure (change amount per unit time) by the rigidity of the pilot chamber R11. (Current presumed flow amount=Inclination of actual servo pressure/Rigidity of pilot chamber R11). The inflow or outflow amount correcting portion 173 obtains a flow amount to be actually realized (flow amount based on the control signal of the control portion 170, i.e., the "target flow amount") which is calculated at the control portion 170 based on the target servo pressure relative to the servo chamber R5 from the control portion 170. The inflow or outflow amount correcting portion 173 executes a correction that changes the control signal towards the flow amount increasing side (i.e., the increase correction processing) when the presumed flow amount is less than the target flow amount. The inflow or outflow amount correcting portion 173 increases the target flow amount set at the control portion 170 by the correcting amount in order to increase the control signal. The correcting amount corresponds to the flow amount (or the ratio which the flow amount) increased by the correction of the inflow or outflow amount correcting portion 173 relative to the target flow amount set at the control portion 170.

The inflow or outflow amount correcting portion 173 calculates the increasing ratio relative to the target flow amount (delay ratio) and sets the increasing ratio as the correcting amount. In other words, the inflow or outflow amount correcting portion 173 sets the correcting amount towards the increasing side in the increase correction processing based on the difference between the target flow amount calculated based on the target servo pressure and the presumed flow amount calculated based on the actual servo pressure. Explaining more in detail, the inflow or outflow amount correcting portion 173 sets the increasing ratio which is calculated based on the "target flow amount" and the "difference between the target flow amount and the presumed flow amount" as the correcting amount. For example, the inflow or outflow amount correcting portion 173 calculates the correcting amount based on the following formula, i.e., "Correcting amount=(Target flow amount−Presumed flow amount)/Target flow amount". Then, the inflow or outflow amount correcting portion 173 calculates the target flow amount after correction (corrected target flow amount) based on the following formula, i.e., "Corrected target flow amount=(1+Correcting amount)×Target flow amount". The inflow or outflow amount correcting portion 173 corrects the target flow amount of the control portion 170 to the corrected target flow amount calculated by the above formula. The control portion 170 sends the control signal (corrected control signal) which corresponds to the corrected target flow amount to the pressure increasing valve 15b7.

Figure 4:
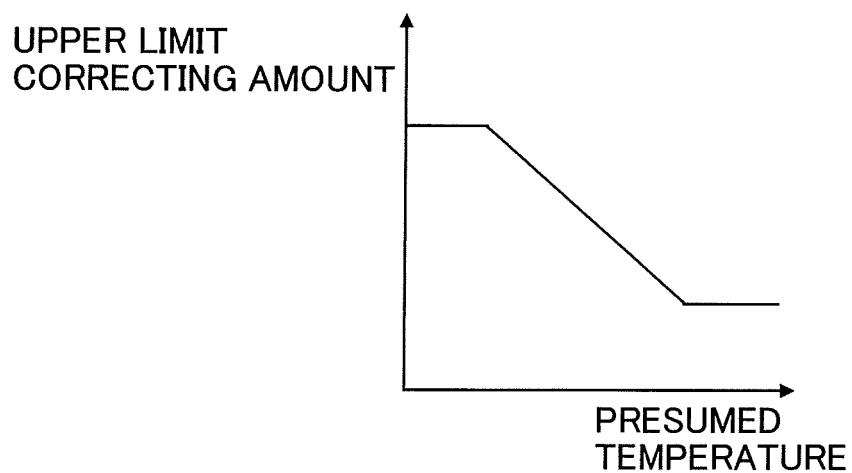
FIG. 4 is an explanatory view explaining a relationship between the presumed temperature and the upper limit correcting amount (map) according to the embodiment.

The inflow or outflow amount correcting portion 173 calculates the upper limit correcting amount which is the upper limit value of the correcting amount. The inflow or outflow amount correcting portion 173 sets the correcting amount sets the correcting amount to a value equal to or less than the upper limit correcting amount. The upper limit correcting amount is set within a range of deviation ratio of the pressure decreasing valve 15b6 and the pressure increasing valve 15b7. For example, the upper limit correcting amount is set equal to or less than 30% (i.e., 0.3) when the possible operation time deviation (deviation ratio) that may occur at the pressure decreasing valve 15b6 and the pressure increasing valve 15b7 is within +30% and −30%. The inflow or outflow amount correcting portion 173 sets the upper limit correcting amount based on the presumption result of the temperature presuming portion 174 (presumed temperature of brake fluid) which will be explained later. The inflow or outflow amount correcting portion 173 sets the upper limit correcting amount such that the lower the presumed temperature, the larger the upper limit correcting amount is set, as shown in FIG. 4. The inflow or outflow amount correcting portion 173 sets the correcting amount as the upper limit correcting amount when the calculated correcting amount is more than the upper limit correcting amount.

Further, the inflow or outflow amount correcting portion 173 memorizes the maximum value (but, noted that the value is equal to or less than the upper limit correcting amount) of the calculated correcting amount in the one-time braking operation (from the depression of the brake pedal 11 until the depression is released). The inflow or outflow amount correcting portion 173 executes the increase correction processing using a larger value between the maximum value of the memorized correcting amount and this time calculated correcting amount, comparing the maximum value of the memorized correcting amount (for example, the first time calculated correcting amount) with this time calculated correcting amount (the second time calculated correcting amount), when a plurality of corrections is made in the one-time braking operation. The inflow or outflow amount correcting portion 173 memorizes (or renews) the this time correcting amount as the maximum value when the correcting amount of this time (second time) is larger than the memorized maximum value of the correcting amount in the one-time braking operation and keeps the memorized maximum value correcting amount, as the maximum value when the memorized maximum value of the correcting amount is larger than the correcting amount of this time (second time) in the one-time braking operation. In other words, when a plurality of increase corrections is made in one time braking operation, the inflow or outflow amount correcting portion 173 executes the increase correction processing, using the maximum value of the correcting amount calculated during the braking operation. When the braking operation ends, the inflow or outflow amount correcting portion 173 resets the maximum value of correcting amount.

Further, the inflow or outflow amount correcting portion 173 determines whether the increase correction processing should be executed or not in response to the judgement result of the rigidity judging portion 175 which will be explained later. The inflow or outflow amount correcting portion 173 prohibits the execution of the increase correction processing when the rigidity of the pilot chamber R11 is judged to be equal to or more than a predetermined value by the rigidity judging portion 175. The inflow or outflow amount correcting portion 173 permits the execution of the increase correction processing when the rigidity of the pilot chamber R11 is judged to be less than the predetermined value by the rigidity judging portion 175.

The temperature presuming portion 174 presumes the temperature of the brake fluid of the hydraulic pressure braking force generating device A (booster mechanism 15). The temperature presuming portion 174 calculates the temperature of the brake fluid based on outside temperature information obtained by the outside temperature sensor 91 and the frequency of the braking operation (for example, the number of operations performed within a predetermined time period). The temperature presuming portion 174 can presume the temperature of the brake fluid using a map indicating the relationship between the outside temperature and the frequency of braking operation and the temperature of the brake fluid which is prepared in advance by, for example, an experimental work or the like. As a factor of temperature presuming, instead of, or in addition to the frequency of braking operation, the time period of braking operation or the elapsed time from the ignition ON may be used. Further, the temperature may be presumed only by the outside temperature. Still further, the temperature presuming portion 174 obtains the temperature information of the brake fluid from the hydraulic fluid temperature sensor, if such sensor is provided in the hydraulic pressure braking force generating device A (for example, in the booster mechanism 15 or in the vicinity of the servo chamber R15), and presumes the temperature of the brake fluid based on the obtained temperature information. As explained above, the temperature presuming portion 174 can presume the temperature of the brake fluid by a well-known method. The temperature presuming portion 174 sends the presumption result to the inflow or outflow amount correcting portion 173.

The rigidity judging portion 175 judges whether or not the rigidity of the pilot chamber R11 is less than a predetermined value. As shown in FIG. 1, the pilot chamber R11 includes a damper 92. The damper 92 is formed by a cylinder 921, a piston 922 which is disposed in the cylinder 921 and is slidable within the cylinder 921 and a spring 923 which biases the piston 922 towards the pilot chamber R11 side. The cylinder 921 is provided in a spool 15a2 (or the cylinder body 15a1) and is opened to the pilot chamber R11. The initial position of the piston 922 is positioned for example, by a projecting portion (not shown) formed at an opening portion of the cylinder 921.

Figure 5:
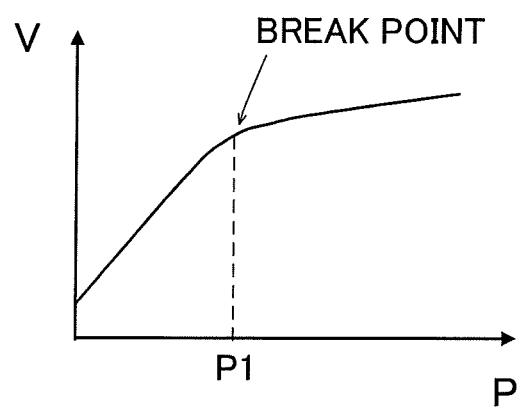
FIG. 5 is an explanatory view explaining PV performance characteristics of the pilot chamber according to the embodiment.

The PV performance characteristics of the pilot chamber R11 indicates a break point caused by the damper 92, for example, as shown in FIG. 5. In other words, the rigidity of the pilot chamber R11 (inclination of PV performance characteristics) changes at least between the two values in response to the pressure or the flow amount of the pilot chamber R11. In FIG. 5, the symbol "P" indicates the pressure and the symbol "V" indicates the volume. The rigidity of the pilot chamber R11 is stable with a relatively small value until the piston 922 reaches the bottom of the cylinder 921 (bottoming of the piston 922), but thereafter (after bottoming), the value of the rigidity becomes relatively great. The rigidity judging portion 175 may be said to judge whether the damper 92 is in a bottoming state or not. The rigidity judging portion 175 can calculate the rigidity of the pilot chamber r11 based on, for example, the value of the actual servo pressure and the PV performance characteristics of the pilot chamber R11 set in advance (map). The value of the actual servo pressure structurally corresponds to the value correlating with the pilot pressure. The predetermined value for judgement of the rigidity judging portion 175 corresponds to the value after the break point in the PV performance characteristics. In other words, the predetermined value is a value relating to the bottoming of the damper 92 and is set to the rigidity value after bottoming.

The rigidity judging portion 175 judges whether or not the actual servo pressure (or the pilot pressure converted from the actual servo pressure) is less than the predetermined pressure P1 at the break point in the PV performance characteristics (pressure corresponding to the break point). The predetermined pressure P1 may be, for example, a value obtained by converting the pilot pressure corresponding to the break point into the actual servo pressure. The rigidity judging portion 175 judges that the rigidity of the pilot chamber R11 is less than the predetermined value when the actual servo pressure is less than the predetermined pressure P1. In other words, in this case, the brake ECU 17 may judge that the damper 92 is not yet reached to the bottoming. Oppositely, the rigidity judging portion 175 judges that the rigidity of the pilot chamber R11 is equal to or more than the predetermined value when the actual servo pressure is I equal to or more than the predetermined pressure P1. In this case, the brake ECU 17 may judge that the damper 92 has reached to the bottoming. The rigidity judging portion 175 sends the judgement result to the inflow or outflow amount correcting portion 173. It is noted here that since the influence of the damper 92 is greater than the other rigidity determining factors, the rigidity of the pilot chamber R11 can be said to be the rigidity of hydraulic system including the pilot chamber R11 and the servo chamber R5.

Figure 6:
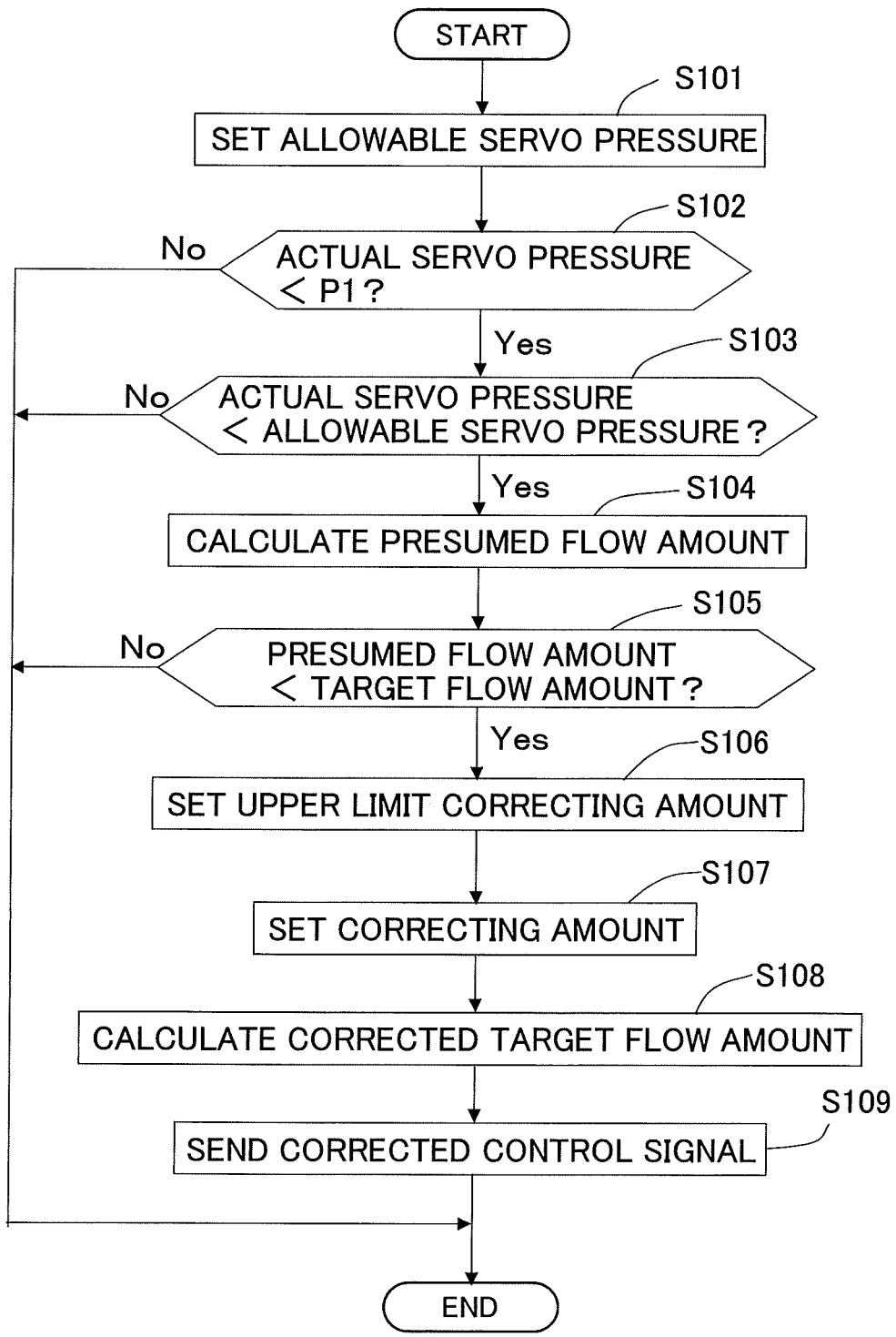
FIG. 6 is a flowchart explaining the increase correction processing according to the embodiment.

The control flow including the increase correction processing according to the embodiment will be explained with reference to FIG. 6. First, the allowable delay time setting portion 171 sets the allowable delay time based on the inclination of the target servo pressure and sets the allowable servo pressure at each timing based on the allowable delay time (S101). The rigidity judging portion 175 judges whether the actual servo pressure is less than the predetermined pressure P1 or not (S102). When the actual servo pressure is less than the predetermined pressure P1 (S102: Yes), the execution of the increase correction processing is permitted and the judging portion 172 judges whether the actual servo pressure is less than the allowable servo pressure or not (S103). In the increase correction processing, when the actual servo pressure is less than the allowable servo pressure, i.e., when the response delay time is equal to or more than the allowable delay time (S103: Yes), the inflow or outflow amount correcting portion 173 calculates the presumed flow amount (S104). Then, the inflow or outflow amount correcting portion 173 judges whether the presumed flow amount is less than the target flow amount or not (S105). If the presumed flow amount is less than the target flow amount (S105: Yes), the inflow or outflow amount correcting portion 173 sets the upper limit correcting amount based on the presumption result by the temperature presuming portion 174. (S196). Next, the inflow or outflow amount correcting portion 173 calculates and sets the correcting amount based on the presumed flow amount, the target flow amount and the upper limit correcting amount as explained above (S107). It is noted that when the execution of increase correction process of this time is the first time in one braking operation, the inflow or outflow amount correcting portion 173 memorizes the calculated correcting amount and at the same time sets the calculated correcting amount as the correcting amount of this time. The inflow or outflow amount correcting portion 173 renews the maximum value of the correcting amount by comparing the memorized correcting amount with the calculated correcting amount at the second time and thereafter of the increase correction processing in one braking operation and sets the renewed maximum value as the correcting amount of that time.

The inflow or outflow amount correcting portion 173 calculates the flow amount after correction by the set correcting amount (corrected target flow amount) and sends the value to the control portion 170 (S108). The control portion 170 sends the control signal (corrected control signal) corresponding to the corrected target flow amount to the pressure decreasing valve 15b6 and the pressure increasing valve 15b7.(S109). According to this embodiment, since the pressure decreasing valve 15b6 is kept to be in closed state in the pressure increasing control, the corrected control signal is sent only to the pressure increasing valve 15b7. It is noted that when the actual servo pressure is equal to or more than the predetermined pressure P1 (S102: No), when the response delay time is less than the allowable delay time (S103: No), or when the presumed flow amount is equal to or more than the target flow amount (S105; No), the increase correction processing is not executed. The brake ECU 17 executes the control including the increase correction processing, per every predetermined time.

(Effects)

According to the embodiment, since the response delay time is judged to be equal to or more than the allowable delay time, the response delay more than expected due to a deviation in the hardware or the like can be detected and the timing whether the inflow or outflow amount of the brake fluid in the servo chamber R5 should be increased or not can be judged. Therefore, it is possible to provide the inflow or outflow amount corrected and increased in correspondence with the deviation in the hardware or the like to the servo chamber R5 at an appropriate timing. In other words, according to the embodiment, keeping the control stability, a sufficient flow amount of the brake fluid in the servo chamber R5 can be assured even an occurrence of deviation in hardware or the like. Thus, the control current to the pressure increasing valve 15b7 can be increased to shorten the response delay time caused thereby. The deviation of the hardware leads to the deviations of the pressure decreasing valve 15b6 and/or the pressure increasing valve 15b7 (for example, deviation in operation accuracy) and such deviation becomes a factor of deviation of the flow amount to the servo chamber R5 relative to the brake control.

Further, according to the embodiment, since the larger the change amount of the target servo pressure per unit time (the increasing amount in pressure increasing operation and the decreasing amount in the pressure decreasing operation), the shorter the allowable delay time is set, the allowable delay time is set in response to the braking operation. Therefore, according to this structure, shorter allowable delay time is set upon an emergency braking operation to operate faster against the response delay.

Further, according to the embodiment, the execution of the increase correction processing is permitted only when the rigidity of the pilot chamber R11 corresponds to the rigidity before the damper 92 performs a bottoming (i.e., when the rigidity of the pilot chamber R11 is less than the predetermined value). In other words, the increase correction processing is executed under the state that the rigidity of the pilot chamber R11 keeps constant with a value relatively low, i.e., the state that the stability of hydraulic control for the pilot chamber R11, and accordingly, for the servo chamber R5 is relatively high. Thus, the deterioration of control stability caused by the execution of the increase correction processing can be suppressed.

Still further, according to the embodiment, since the correcting amount is set based on the difference between the target flow amount and the presumed flow amount, the increase correction processing can be executed by the correcting amount that corresponds to the current amount (current flow amount). Further, according to the embodiment, the correcting amount is set as the increasing ratio based on the "target flow amount" and the "difference between the target flow amount and the presumed flow amount" and at the same time the increasing ratio is set within a range of deviation ratio of the pressure decreasing valve 15b6 and/or the pressure increasing valve 15b7 (magnitude of deviation of operating time responding to the instruction signal: for example, plus or minus 30%). Thus, in this structure, subject of the execution of the increase correction processing extending to any deviation of the hardware that will never happen can be prevented to suppress any deterioration of the control stability caused by an excess correcting amount.

Figure 7:
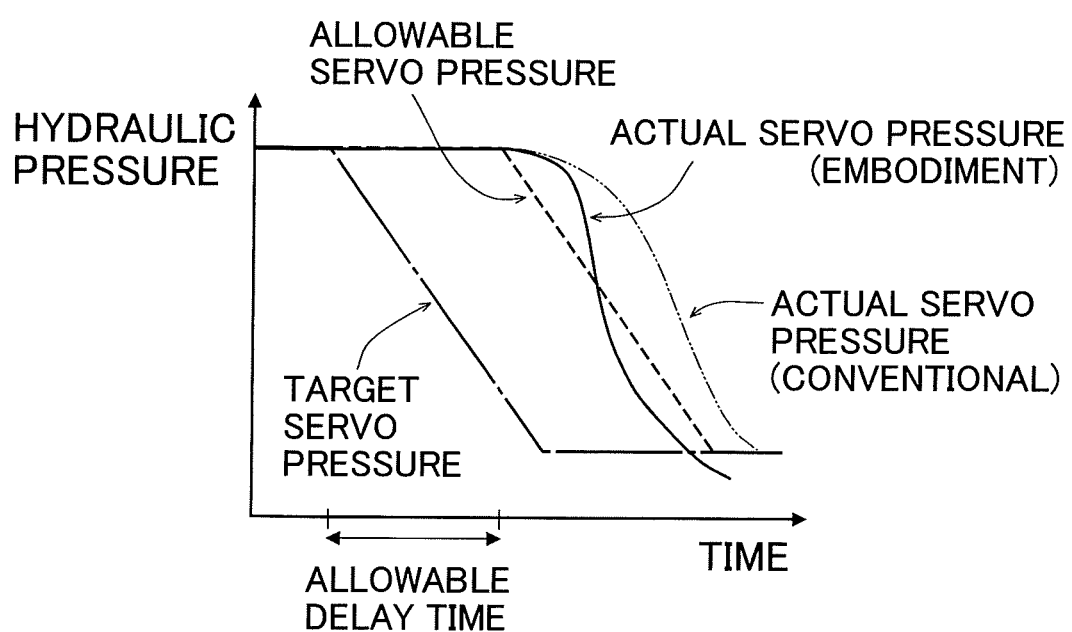
FIG. 7 is an explanatory view explaining the increase correction processing according to the embodiment.

When the temperature of the brake fluid is low, the viscosity of the brake fluid becomes high. Therefore, the brake fluid is difficult to flow and a response delay which is more than an expected delay range may possibly arise. Therefore, the factor of deviation of flow amount with respect to the servo chamber R5 includes flow amount decrease of the brake fluid due to an increase of viscosity, in addition to the deviation of hardware. However, according to the embodiment, the lower the presumed temperature of brake fluid, the larger the upper limit correcting amount is set. In other words, when the temperature of the brake fluid is low, i.e., when the viscosity of brake fluid is high, the upper limit value of the correcting amount becomes large and accordingly, a large correcting amount can be set. As explained, according to the embodiment, the correcting amount can be set according to the temperature (viscosity) of the brake fluid. Further, according to the embodiment explained above, mainly the increase correction processing upon pressure increasing control has been explained. However, the increase correction processing upon pressure decreasing control may be executed. In other words, when the response delay time is judged to be equal to or more than the allowable delay time by the judging portion 172, the inflow or outflow amount correcting portion 173 executes the increase correction processing which increases the flowing-out amount of brake fluid from the hydraulic pressure chamber R5, corresponding to the difference between the actual hydraulic pressure and the target hydraulic pressure, by controlling the valve portions 15b6 and 15b7. In this case, as shown in FIG. 7, the judging portion 172 judges that the response delay time is equal to or more than the allowable delay time when the actual servo pressure is larger than the allowable servo pressure. Thus, the same effect can be achieved in the case of pressure decreasing control of the servo pressure.

(Others)

The present invention is not limited to the embodiments explained above, but may include other embodiments, such as for example, the correcting amount is not limited to the ratio (percentage) of increasing, but the correcting amount is defined to be the amount that increases the flow amount. Further, the control that increases the flow amount in the increase correction processing is performed by calculation of the corrected target flow amount as explained above, but may be performed by increasing the control current by a predetermined ratio set in advance. Further, the inflow or outflow amount correcting portion 173 may calculate or set the correcting control current by multiplying the difference between the target servo pressure and the actual servo pressure or the square of the difference by the gain. In other words, the brake ECU 17 may increase in gain variable the control current output relative to the response delay time.

Further, the inflow or outflow amount correcting portion 173 keeps the correcting amount (increasing ratio; maximum value) memorized in the one braking operation without resetting and sends the corrected target flow amount which is added by the memorized correcting amount upon the next and thereafter braking operations to the control portion 170. In other words, the brake ECU 17 memorizes the calculated correcting amount as a system (hydraulic pressure braking force generating device A) delay ratio and executes the feed-back control in which the correcting amount (delay ratio) is added to the next braking operation. Further, an addition to the deviation of the flow amount of the electromagnetic valve (deviation in the hardware, the magnitude of the fluid viscosity), for example, "deviation of fluid amount at the undercarriage components" caused by the deviation of hardware of the undercarriage components (such as, wheel cylinders WC) or the fade state may be a factor of delay of hydraulic pressure control. The invention is effective to solve the response delay caused by such factor. Further, the structure which generates the servo pressure (drive portion) is not limited to the structure having the high pressure source and the electromagnetic valves, but the structure of an electrically operated booster (for example, system which drives the regulator by motor) may be used. It is further noted that instead of using the spool valve mechanism for the regulator 15a, a ball valve mechanism may be used. The electromagnetic valves may be changed to linear valves.

(Summary)

The hydraulic pressure control device according to the embodiment controls valve portions 15b6 and 15b7 which adjust a fluid flowing into or flowing out of a hydraulic pressure chamber R5 so that an actual hydraulic pressure i.e., a hydraulic pressure of the fluid in the hydraulic pressure chamber R5 formed in a braking device "A" becomes a target hydraulic pressure which is a target value of the actual hydraulic pressure of the fluid, wherein the hydraulic pressure control device includes a judging portion 172 which judges whether or not a response delay time of the actual hydraulic pressure relative to the target hydraulic pressure is equal to or more than a predetermined allowable delay time and an inflow or outflow amount correcting portion 173 which executes an increase correction processing which increases "an inflow or outflow amount of the fluid with respect to the hydraulic pressure chamber R5 (an inflow amount of the fluid flowing into the hydraulic pressure chamber R5 or an outflow amount of the fluid flowing from the hydraulic pressure chamber R5)" corresponding to a difference between the actual hydraulic pressure and the target hydraulic pressure by controlling the valve portions 15b6 and 15b7, when the judging portion 172 judges that the response delay time is equal to or more than the predetermined allowable delay time.

The hydraulic pressure control device according to the embodiment further includes an allowable delay time setting portion 171 which sets the allowable delay time such that the larger a change amount of the target hydraulic pressure per unit time, the shorter the allowable delay time is set.

The hydraulic pressure control device according to the embodiment further includes a regulator 15a having a pilot chamber R11 which generates a pilot pressure corresponding to the actual hydraulic pressure by controlling the valve portions 15b6 and 15b7, a damper 92 provided in the pilot chamber R11 and a rigidity judging portion 175 which judges whether or not a rigidity of the pilot chamber R11 is less than a predetermined value associated with a bottoming of the damper 92, wherein the inflow or outflow amount correcting portion 173 executes the increase correction processing when the rigidity of the pilot chamber R11 is judged to be less than the predetermined value by the rigidity judging portion 175.

The inflow or outflow amount correcting portion 173 according to the embodiment sets a correcting amount towards an increasing side in the increase correction processing based on the difference between a target flow amount which is the inflow or outflow amount of the fluid relative to the hydraulic pressure chamber R5 calculated based on the target hydraulic pressure and a presumed flow amount which is a current inflow or outflow amount of the fluid relative to the hydraulic pressure chamber R5 calculated based on the actual hydraulic pressure.

The inflow or outflow amount correcting portion 173 according to the embodiment sets the correcting amount as an increasing ratio calculated based on the target flow amount and the difference between the target flow amount and the presumed flow amount and then sets the increasing ratio to be within a range of a deviation ratio of the valve portions 15b6 and 15b7.

The hydraulic pressure control device according to the embodiment further includes a temperature presuming portion 174 which presumes the temperature of the fluid, wherein the inflow or outflow amount correcting portion 173 sets an upper limit value of the correcting amount towards the increasing side larger in the increase correction processing as the presumed temperature of the fluid by temperature presuming portion 174 is lower.

REFERENCE SIGNS LIST

11; brake pedal,
12: master cylinder,
13; stroke simulator portion,
14; reservoir,
15; booster mechanism,
15a; regulator,
15b; pressure supply device,
15b1; reservoir,
15b2; accumulator,
15b6; pressure decreasing valve (valve portion),
15b7; pressure increasing valve (valve portion),
16; actuator,
17; brake ECU (hydraulic pressure control device),
170; control portion,
171; allowable delay time setting potion,
172; judging portion,
173; inflow or outflow amount correcting portion,
174; temperature presuming portion,
175: rigidity judging portion,
92; damper,
"A"; hydraulic pressure braking force generating device,
R5; servo chamber (hydraulic pressure chamber),
R11; pilot chamber,
WC; wheel cylinder.

The invention claimed is:

1. A hydraulic pressure control device configured to control a valve portion which adjusts a fluid flow flowing into or flowing out of a hydraulic pressure chamber so that an actual hydraulic pressure of the fluid, i.e., a hydraulic pressure of the fluid in the hydraulic pressure chamber formed in a braking device becomes a target hydraulic pressure which is a target value of the actual hydraulic pressure of the fluid, wherein the hydraulic pressure control device comprises:
a judging portion configured to judge whether or not a response delay time of the actual hydraulic pressure relative to the target hydraulic pressure, which is a time from when the target hydraulic pressure changes until the actual hydraulic pressure changes with respect to the target hydraulic pressure change, is equal to or more than a predetermined allowable delay time; and
an inflow or outflow amount correcting portion configured to, when the judging portion judges that the response delay time is equal to or more than the predetermined allowable delay time, control the valve portion to increase an inflow or outflow amount of the fluid with respect to the hydraulic pressure chamber corresponding to a difference between the actual hydraulic pressure and the target hydraulic pressure.

2. The hydraulic pressure control device according to claim 1, further comprising:
an allowable delay time setting portion configured to set the allowable delay time such that the larger a change amount of the target hydraulic pressure per unit time, the shorter the allowable delay time is set.

3. The hydraulic pressure control device according to claim 1, further comprising:
a regulator having a pilot chamber configured to generate a pilot pressure corresponding to the actual hydraulic pressure by controlling the valve portion;
a damper provided in the pilot chamber; and
a rigidity judging portion configured to judge whether or not a rigidity of the pilot chamber is less than a predetermined value associated with a bottoming of the damper, wherein
the inflow or outflow amount correcting portion executes the increase correction processing when the rigidity of the pilot chamber is judged to be less than the predetermined value by the rigidity judging portion.

4. The hydraulic pressure control device according to claim 1, wherein
the inflow or outflow amount correcting portion sets a correcting amount towards an increasing side in the increase correction processing based on the difference between a target flow amount which corresponds to an inflow or outflow amount of the fluid with respect to the hydraulic pressure chamber calculated based on the target hydraulic pressure and a presumed flow amount which corresponds to a current inflow or outflow amount of the fluid with respect to the hydraulic pressure chamber calculated based on the actual hydraulic pressure.

5. The hydraulic pressure control device according to claim 4, wherein
the inflow or outflow amount correcting portion sets the correcting amount as an increasing ratio calculated based on the target flow amount and the difference between the target flow amount and the presumed flow amount and sets the increasing ratio to be within a range of a deviation ratio of the valve portion.

6. The hydraulic pressure control device according to claim 1, further comprising:
a temperature presuming portion configured to presume a temperature of the fluid, wherein
the inflow or outflow amount correcting portion sets an upper limit value of the correcting amount towards the increasing side larger in the increase correction processing as the presumed temperature of the fluid presumed by the temperature presuming portion is lower.

* * * * *